US008524625B2

(12) United States Patent
Dight et al.

(10) Patent No.: US 8,524,625 B2
(45) Date of Patent: Sep. 3, 2013

(54) COMPOSITIONS AND METHODS FOR IMPROVING THE HYDROTHERMAL STABILITY OF MESOSTRUCTURED ZEOLITES BY RARE EARTH ION EXCHANGE

(75) Inventors: Lawrence B. Dight, Manasquan, NJ (US); Javier Garcia-Martinez, Alicante (ES); Ioulia Valla, Sturbridge, MA (US); Marvin M. Johnson, Bartlesville, OK (US)

(73) Assignee: Rive Technology, Inc., Boston, MA (US)

( * ) Notice: Subject to any disclaimer, the term of this patent is extended or adjusted under 35 U.S.C. 154(b) by 643 days.

(21) Appl. No.: 12/684,405

(22) Filed: Jan. 8, 2010

(65) Prior Publication Data
US 2010/0190632 A1   Jul. 29, 2010

Related U.S. Application Data

(60) Provisional application No. 61/145,723, filed on Jan. 19, 2009.

(51) Int. Cl.
*B01J 29/06* (2006.01)

(52) U.S. Cl.
USPC .......... 502/73; 502/60; 502/79; 502/65; 423/700; 423/713; 423/714; 423/716

(58) Field of Classification Search
USPC ............ 502/60, 73, 79, 65; 423/700, 713, 423/714, 716
See application file for complete search history.

(56) References Cited

U.S. PATENT DOCUMENTS

| | | |
|---|---|---|
| 3,709,853 A | 1/1973 | Karapinka |
| 3,864,280 A | 2/1975 | Schneider |
| 4,016,218 A | 4/1977 | Haag et al. |
| 4,088,671 A | 5/1978 | Kobylinski |
| 4,196,182 A | 4/1980 | Willermet et al. |
| 4,205,055 A | 5/1980 | Maire et al. |
| 4,263,268 A | 4/1981 | Knox et al. |
| 4,318,824 A | 3/1982 | Turner |
| 4,439,349 A | 3/1984 | Everett et al. |
| 4,564,207 A | 1/1986 | Russ et al. |
| 4,609,972 A | 9/1986 | Edeling et al. |
| 4,637,623 A | 1/1987 | Bubik |
| 4,689,314 A | 8/1987 | Martinez et al. |
| 4,704,375 A | 11/1987 | Martinez et al. |
| 4,761,272 A | 8/1988 | Hucke |
| 4,775,655 A | 10/1988 | Edwards et al. |
| 4,806,689 A | 2/1989 | Gier et al. |
| 4,816,135 A | 3/1989 | Martinez et al. |
| 4,836,737 A | 6/1989 | Holmes et al. |
| 4,857,494 A | 8/1989 | Martinez et al. |
| 4,891,458 A | 1/1990 | Innes et al. |
| 4,894,215 A | 1/1990 | Kawakubo et al. |
| 4,894,354 A | 1/1990 | Martinez et al. |
| 4,968,405 A | 11/1990 | Wachter |
| 5,013,699 A | 5/1991 | Vassilakis et al. |
| 5,051,385 A | 9/1991 | Wachter |
| 5,057,296 A | 10/1991 | Beck |
| 5,061,147 A | 10/1991 | Nespor |
| 5,095,169 A | 3/1992 | Skeels et al. |
| 5,102,643 A | 4/1992 | Kresge et al. |
| 5,116,794 A | 5/1992 | Skeels et al. |
| 5,134,242 A | 7/1992 | Le et al. |
| 5,134,243 A | 7/1992 | Bhore et al. |
| 5,160,033 A | 11/1992 | Vassilakis et al. |
| 5,200,058 A | 4/1993 | Beck et al. |
| 5,207,892 A | 5/1993 | Vassilakis et al. |
| 5,208,197 A | 5/1993 | Vassilakis et al. |
| 5,221,648 A | 6/1993 | Wachter |
| 5,232,580 A | 8/1993 | Le et al. |
| 5,254,327 A | 10/1993 | Martinez et al. |
| 5,256,277 A | 10/1993 | Del Rosi et al. |
| 5,258,570 A | 11/1993 | Skeels et al. |
| 5,260,501 A | 11/1993 | Bhore et al. |
| 5,288,393 A | 2/1994 | Jessup et al. |
| 5,308,475 A | 5/1994 | Degnan et al. |
| 5,344,553 A | 9/1994 | Shih |
| 5,347,060 A | 9/1994 | Hellring et al. |
| 5,360,774 A | 11/1994 | Martinez et al. |
| 5,391,433 A | 2/1995 | Kawakubo et al. |
| 5,393,718 A | 2/1995 | Skeels et al. |
| 5,401,384 A | 3/1995 | Martinez et al. |
| 5,458,929 A | 10/1995 | Earls et al. |

(Continued)

FOREIGN PATENT DOCUMENTS

| | | |
|---|---|---|
| JP | 2004143026 | 5/2004 |
| WO | 0117901 | 3/2001 |

(Continued)

OTHER PUBLICATIONS

Scherzer et al., "Ion-Exchanged Ultrastable Y Zeolites. 3. Gas Oil Cracking over Rare Earth-Exchanged Ultrastable Y Zeolites", Ind. Eng. Chem, Prod. Res. Dev., vol. 17, No. 3, 1978, pp. 219-223.*
Al-Khattaf, S. et al., The Role of Diffusion in Alkyl-Benzenes Catalytic Cracking, Appl. Catal. A: Gen. 226; 139-153, (2002).
Bagri, R. et al.; Catalytic Pyrolysis of Polyethylene; Anal. Pyrolysis, 63:29-41 (2002).
Conway, B.E., Electrochemical Supercapacitors, Kluwer Academic/Plenum Publishers, New York, 1999, pp. 11-22, 51-63, 125-135, 183-219, 221-224, 255, 335-338, 337-415, 417-440, 598, 602, 615, and 649-666.
Corma, A., From Microporous to Mesoporous Molecular Sieve Materials and Their Use in Catalysis, Chem. Rev., 97:2373-2419, (1997).
CSIC NM014-Method of Preparation of Mesoporous Alumina with High Thermal Stability, http://www.serina.es/escaparate/verproducto.cgi?idproducto=4980&refcompra=NULO, downloaded May 9, 2007, 2 pages.
Davis, M.E., Ordered Porous Materials for Emerging Applications, Nature, 417:813-821 (2002).
Davis, M.E., Zeolite and Molecular Sieve Synthesis, Chem. Mater., 4:756-768 (1992).
De Moor, P-P.E.A. et al., Imaging the Assembly Process of the Organic-Mediated Synthesis of a Zeolite, Chem. Eur. J., 5(7):2083-2088 (1999).

(Continued)

*Primary Examiner* — Elizabeth Wood
(74) *Attorney, Agent, or Firm* — Hovey Williams LLP

(57) ABSTRACT

Compositions and methods for preparing mesostructured zeolites having improved hydrothermal stability. Such mesostructured zeolites can be prepared by subjecting a zeolite to rare earth ion exchange prior to and/or subsequent to introducing mesoporosity into the zeolite.

13 Claims, 7 Drawing Sheets

(56) References Cited

U.S. PATENT DOCUMENTS

| | | | |
|---|---|---|---|
| 5,510,431 | A | 4/1996 | Earls et al. |
| 5,538,710 | A | 7/1996 | Guo et al. |
| 5,601,798 | A * | 2/1997 | Cooper et al. ............... 423/700 |
| 5,614,453 | A | 3/1997 | Occelli |
| 5,628,978 | A | 5/1997 | Tejada et al. |
| 5,636,437 | A | 6/1997 | Kaschmitter et al. |
| 5,659,099 | A | 8/1997 | Skeels et al. |
| 5,662,965 | A | 9/1997 | Deguchi et al. |
| 5,672,556 | A | 9/1997 | Pinnavaia et al. |
| 5,712,402 | A | 1/1998 | Pinnavaia et al. |
| 5,744,673 | A | 4/1998 | Skeels et al. |
| 5,770,040 | A | 6/1998 | Tejada et al. |
| 5,785,946 | A | 7/1998 | Pinnavaia et al. |
| 5,786,294 | A | 7/1998 | Sachtler et al. |
| 5,795,559 | A | 8/1998 | Pinnavaia et al. |
| 5,800,800 | A | 9/1998 | Pinnavaia et al. |
| 5,800,801 | A | 9/1998 | Tejada |
| 5,840,264 | A | 11/1998 | Pinnavaia et al. |
| 5,840,271 | A | 11/1998 | Carrazza et al. |
| 5,849,258 | A | 12/1998 | Lujano et al. |
| 5,855,864 | A | 1/1999 | Pinnavaia et al. |
| 5,858,457 | A | 1/1999 | Brinker et al. |
| 5,892,080 | A | 4/1999 | Alberti et al. |
| 5,902,564 | A | 5/1999 | Lujano et al. |
| 5,952,257 | A | 9/1999 | Tejada et al. |
| 5,958,367 | A | 9/1999 | Ying et al. |
| 5,958,624 | A | 9/1999 | Frech et al. |
| 5,961,817 | A | 10/1999 | Wachter et al. |
| 5,985,356 | A | 11/1999 | Schultz et al. |
| 5,993,768 | A | 11/1999 | Zappelli et al. |
| 6,004,617 | A | 12/1999 | Schultz et al. |
| 6,015,485 | A | 1/2000 | Shukis et al. |
| 6,022,471 | A | 2/2000 | Wachter et al. |
| 6,024,899 | A | 2/2000 | Peng et al. |
| 6,027,706 | A | 2/2000 | Pinavaia et al. |
| 6,087,044 | A | 7/2000 | Iwase et al. |
| 6,096,828 | A | 8/2000 | DePorter et al. |
| 6,106,802 | A | 8/2000 | Lujano et al. |
| 6,139,721 | A | 10/2000 | Baldiraghi et al. |
| 6,162,414 | A | 12/2000 | Pinnavaia et al. |
| 6,193,943 | B1 | 2/2001 | Pinnavaia et al. |
| 6,204,424 | B1 | 3/2001 | Yadav et al. |
| 6,248,691 | B1 | 6/2001 | Gadkaree et al. |
| 6,297,293 | B1 | 10/2001 | Bell et al. |
| 6,299,855 | B1 | 10/2001 | Lujano et al. |
| 6,319,872 | B1 | 11/2001 | Manzer et al. |
| 6,334,988 | B1 | 1/2002 | Gallis et al. |
| 6,391,278 | B1 | 5/2002 | Pinnavaia et al. |
| 6,410,473 | B1 | 6/2002 | Pinnavaia et al. |
| 6,413,489 | B1 | 7/2002 | Ying et al. |
| 6,413,902 | B1 | 7/2002 | Pinnavaia et al. |
| 6,419,820 | B1 | 7/2002 | Bogdan et al. |
| 6,476,085 | B2 | 11/2002 | Manzer et al. |
| 6,476,275 | B2 | 11/2002 | Schmidt et al. |
| 6,485,702 | B1 | 11/2002 | Lujano et al. |
| 6,489,168 | B1 | 12/2002 | Wang et al. |
| 6,495,487 | B1 | 12/2002 | Bogdan |
| 6,515,845 | B1 | 2/2003 | Oh et al. |
| 6,524,470 | B1 | 2/2003 | Kasztelan et al. |
| 6,538,169 | B1 | 3/2003 | Pittman et al. |
| 6,541,539 | B1 | 4/2003 | Yang et al. |
| 6,544,923 | B1 | 4/2003 | Ying et al. |
| 6,548,440 | B1 | 4/2003 | Pham et al. |
| 6,558,647 | B2 | 5/2003 | Lacombe et al. |
| 6,580,003 | B2 | 6/2003 | Deng et al. |
| 6,583,186 | B2 | 6/2003 | Moore, Jr. |
| 6,585,948 | B1 | 7/2003 | Ryoo |
| 6,585,952 | B1 | 7/2003 | Pinnavaia et al. |
| 6,592,764 | B1 | 7/2003 | Stucky et al. |
| 6,620,402 | B2 | 9/2003 | Jacobsen et al. |
| 6,623,967 | B1 | 9/2003 | Willson, III |
| 6,649,413 | B1 | 11/2003 | Schultz et al. |
| 6,656,443 | B2 | 12/2003 | Klett |
| 6,669,924 | B1 | 12/2003 | Kaliaguine et al. |
| 6,689,336 | B2 | 2/2004 | Kanno |
| 6,702,993 | B2 | 3/2004 | Pinnavaia et al. |
| 6,706,169 | B2 | 3/2004 | Pinnavaia et al. |
| 6,706,659 | B2 | 3/2004 | Gillespie et al. |
| 6,710,003 | B2 | 3/2004 | Jan et al. |
| 6,746,659 | B2 | 6/2004 | Pinnavaia et al. |
| 6,756,515 | B2 | 6/2004 | Rende et al. |
| 6,762,143 | B2 | 7/2004 | Shan et al. |
| 6,770,258 | B2 | 8/2004 | Pinnavaia et al. |
| 6,793,911 | B2 | 9/2004 | Koegler et al. |
| 6,797,153 | B1 | 9/2004 | Fukuyama et al. |
| 6,797,155 | B1 | 9/2004 | Chester et al. |
| 6,800,266 | B2 | 10/2004 | Pinnavaia et al. |
| 6,809,061 | B2 | 10/2004 | Bogdan et al. |
| 6,811,684 | B2 | 11/2004 | Mohr et al. |
| 6,814,943 | B2 | 11/2004 | Radcliffe et al. |
| 6,818,589 | B1 | 11/2004 | Gillespie |
| 6,833,012 | B2 | 12/2004 | Rogers |
| 6,841,143 | B2 | 1/2005 | Inagaki et al. |
| 6,843,906 | B1 | 1/2005 | Eng |
| 6,843,977 | B2 | 1/2005 | Pinnavaia et al. |
| 6,846,546 | B2 | 1/2005 | Kuroda et al. |
| 6,866,925 | B1 | 3/2005 | Chane-Ching |
| 6,869,906 | B2 | 3/2005 | Pinnavaia et al. |
| 6,936,234 | B2 | 8/2005 | Bilenko |
| 6,998,104 | B2 | 2/2006 | Tao et al. |
| 7,084,087 | B2 | 8/2006 | Shan et al. |
| 7,589,041 | B2 | 9/2009 | Ying et al. |
| 7,807,132 | B2 | 10/2010 | Garcia-Martinez |
| 7,976,696 | B2 | 7/2011 | Ying et al. |
| 8,007,663 | B2 | 8/2011 | Ying et al. |
| 8,008,223 | B2 | 8/2011 | Garcia-Martinez |
| 2001/0031241 | A1 | 10/2001 | Lacombe et al. |
| 2001/0042440 | A1 | 11/2001 | Miyazawa et al. |
| 2003/0054954 | A1 | 3/2003 | Chane-Ching et al. |
| 2004/0067842 | A1 | 4/2004 | Pinnavaia et al. |
| 2004/0138051 | A1 | 7/2004 | Shan et al. |
| 2004/0179996 | A1 | 9/2004 | Shan et al. |
| 2005/0074396 | A1 | 4/2005 | Takahashi et al. |
| 2005/0130827 | A1 | 6/2005 | Schunk et al. |
| 2005/0209093 | A1 * | 9/2005 | Chester et al. ............... 502/65 |
| 2005/0214539 | A1 | 9/2005 | Ying et al. |
| 2005/0239634 | A1 * | 10/2005 | Ying et al. ............... 502/64 |
| 2006/0078487 | A1 | 4/2006 | Endo et al. |
| 2007/0244347 | A1 | 10/2007 | Ying et al. |
| 2009/0110631 | A1 | 4/2009 | Garcia-Martinez |
| 2010/0196263 | A1 | 8/2010 | Garcia-Martinez |
| 2011/0118107 | A1 | 5/2011 | Garcia-Martinez |
| 2011/0171121 | A1 | 7/2011 | Senderov |

FOREIGN PATENT DOCUMENTS

| | | |
|---|---|---|
| WO | 0138223 | 5/2001 |
| WO | 2005102964 | 11/2005 |
| WO | 2006031259 | 3/2006 |
| WO | 2006/038912 | 4/2006 |

OTHER PUBLICATIONS

Degnan, T.F. et al., History of ZSM-5 Fluid Catalytic Cracking Additive Development at Mobile, Microporous Mesoporous Mater., 35-36:245-252 (2000).

De A.A. Soler-Illia, Galo, J. et al., Chemical Strategies to Design Textured Materials from Microporous and mesoporous Oxides to Nanonetworks and Hierarchial Structures, Chem. Rev. 102:4093-4138 (2002).

Galo, J. de A. A. et al., Chemical Strategies to Design Textured Materials: from Microporous and Mesoporous Oxides to Nanonetworks and Hierarchical Structures, Chern. Rev., 2002, 102, 4093-4138.

Geidel, E. et al., Characterization of Mesoporous Materials by Vibrational Spectroscopic Techniques, Microporous and Mesoporous Mater., 65:31-42 (2003).

Gonzalez-Pena, V. et al., Thermally Stable Mesoporous Alumina Synthesized with Non-ionic Surfaces in teh Presence of Amines, Microporous and Mesoporous Materials, 44-45, pp. 203-210 (2001).

Goto, Y., Mesoporous Material from Zeolite, Journal of Porous Materials, 9, 2002, pp. 43-48.

Grieken, Rafael et al., Supercritical Fluid Extraction of a Nonionic Surfactant Template from SBA-15 Materials and Consequences on the Porous Structure, Langmuir 2003, 19, 3966-3973, American Chemical Society, Rey Juan Carlos University, Madrid, Spain, University of California, Santa Barbara, California.

Grudzien, Rafal M. et al., Effective Method for Removal of Polymeric Template from SBA-16 Silica Combining Extraction and Temperaure-controlled Calcination, The Royal Society of Chemistry, 2006, J. Mater. Chem., 2006, 16, 819-823.

Harding, R.H. et al., New Developments in FCC Catalyst Technology, Appl. Catal. A:Gen. 221:389-396 (2001).

Huang, L. et al., Investigation of Synthesizing MCM-41/ZSM Composites, J. Phys. Chem. B. 104:2817-2823 (2000).

Iijima, S., Carbon Nanotubes: Past, Present, and Future, Physica B: Condensed Matter, www.elsevier.com/locate/physb, 2002, 323, pp. 1-5.

International Search Report and Written Opinion dated Nov. 7, 2005 from International Patent Application No. PCT/US2005/05918, filed Feb. 25, 2005.

Joo, S.H., et al., Ordered Nanoporous Arrays of Carbon Supporting High Dispersions of Platinum Nanoparticles, Letters to Nature, www.nature.com, Macmillan Magazines Ltd., Nature, vol. 412, Jul. 12, 2001, pp. 169-172.

Karlsson A. et al., Composites of Micro- and Mesoporous Materials: Simultaneous Syntheses of MFI/MCM-41 Like Phases by a Mixed Template Approach, Microporous and mesoporous Mater, 27: 181-192 (1999).

Kloestra, K.R. et al., Mesoporous Material Containing Framework Tectosilicate by Pore-Wall Recrystallization, Chem. Commun., 23:2281-2282 (1997).

Kyotani, T., Control of Pore Structure in Carbon, Carbon, Institute for Chemical Reaction Science, Tohoku University, 2-1-1, Kaiahira, Sendai 980-8577, Japan, Jun. 1, 1999, ElSevier Science Ltd., pp. 269-286.

Lee, H. et al., Materials Science: On the Synthesis of Zeolites, ScienceWeek, downloaded from http://www.scienceweek.com/2003/sa031031-1.htm on Apr. 23, 2005, 5 pages.

Lin, C. et al., Carbonization and Activation of Sol-gel Derived Carbon Xerogels, Carbon, Department of Chemical Engineering, University of South Carolina, Colombia, SC, Aug. 2, 1999, Elsevier Science Ltd., pp. 849-861.

Linssen, T. et al., Mesoporous Templated Silicates: An Overview of Their Synthesis, Catalytic Activation and Evaluation of the Stability, Advances in Colloid and Interface Science, 103:121-147 (2003).

Liu, Y. et al., Steam-Stable MSU-S Aluminosilicate Mesostructures Assembled from Zeolite ZSM-5 and Zeolite Beta Seeds, Angew. Chem. Int. Ed., 7:1255-1258 (2001).

Liu, Y. et al., Aluminosilicate Mesostructures with Improved Acidity and Hydrothermal Stability, J. Mater. Chem., 12:3179-3190 (2002).

Lyons, D.M. et al., Preparation of Ordered Mesoporous Ceria with Enhanced Thermal Stability, The Journal of Materials Chemistry, vol. 12, pp. 1207-1212 (2002).

Mendes, M.F. et al., Optimization of the Process of Concentration of Vitamin E from DDSO using Supercritical CO2, Brazilian Journal of Chemical Engineering, vol. 22, No. 1, pp. 83-91, Jan.-Mar. 2005.

Moller, K. et al., Synthesis of Ordered Mesoporous Methacrylate Hybrid Systems: Hosts for Molecular Polymer Composites, Department of Chemistry, Purdue University, West Lafayette, IN, American Chemical Society, Dec. 28, 1998, pp. 665-673.

Ogura, M. et al., Formation of Uniform Mesopores in ZSM-5 Zeolite through Treatment in Alkaline Solution, Chemistry Letters 2000, pp. 882-883.

On, D.T. et al., Large-Pore Mesoporous Materials with Semi-Crystalline Zeolitic Frameworks, Angew. Chem. Int. Ed., 17:3248-3251 (2001).

Park, D.W. et al., Catalytic Degration of Polyethylene Over Solid Acid Catalysts, Polym. Degrad. Stabil., 65:193-198 (1999).

Patarin, J. et al., Mild Methods for Removing Organic Templates from Inorganic Host Materials, Highlights, Angew. Chem. Int. Ed. 2004, 43:3878-3880.

Prokesova, P. et al., Preparation of Nanosized Micro/Mesoporous Composites via Simultaneous Synthesis of Beta/MCM-48 Phases, Microporous and Mesoporous Materials 64 (2003) pp. 165-174.

Ryoo, R. et al., Synthesis of Highly Ordered Carbon Molecular Sieves via Template-Mediated Structural Transformation, The Journal of Physical Chemistry B, vol. 103, No. 38, Sep. 16, 1999, pp. 7743-7746.

Scherzer, J. et al., Octane-Enhancing Zeolitic FCC Catalysts—Scientific and Technical Aspects, Marcel Dekker, Inc., 42 pages, (1990).

Storck, S. et al., Characterization of Micro- and Mesoporous Solids by Physisorption Methods and Pore-Size Analysis, Applied Catalysts A: Gen. 17:137-146 (1998).

Tao et al., Mesopore-Modified Zeolites: Preparation, Characterization, and Applications, Chem. Rev., vol. 106, pp. 896-910 (2006).

Triantafyllidis K.S. et al., Gas-oil Cracking Activity of Hydrothermally Stable Aluminosilicate Mesostructures (MSU-S) Assembled from Zeolite Seeds: Effect of the Type of Framework Structure and Porosity, Catalyst Today, vol. 112, pp. 33-36 (2006).

Verhoef, M. J. et al., Partial Transformation of MCM-41 Material into Zeolites: Formation of Nanosized MFI Type Crystallites, Chemical Materials, 2001, vol. 13, pp. 683-687.

Yang, P. et al., Generalized Syntheses of Large-Pore Mesoporous Metal Oxides with Semicrystalline Frameworks, Nature, vol. 396, Nov. 12, 1998, pp. 152-155; www.nature.com.

Ying, J. Y. et al., Synthesis and Applications of Supramolecular-Templated Mesoporous Materials, Angew. Chem. Int. Ed., 38:56-77 (1999).

Zhang, Z. et al, Mesoporous Aluminosilicates with Ordered Hexagonal Structure, Strong Acidity, and Extraordinary Hydrothermal Stability at High Temperatures, J. of the American Chem. Society, 2001, vol. 123, pp. 5014-5021.

Poladi, Raja H.P.R. et al., Synthesis, Characterization, and Catalytic Properties of a Microporous/Mesoporous Material, MMM-1, Journal of Solid State Chemistry, 2002, vol. 167, pp. 363-369.

Xia, Yongde et al., On the synthesis and characterization of ZSM-5/MCM-48 aluminosilicate composite materials, Journal of the Royal Society of Chemistry, 2004, pp. 863-870.

Guo et al., Characterization of Beta/MCM-41 Composite Molecular Sieve Compared with the Mechanical Mixture Microporous and Mesoporous Materials, vols. 44-45; pp. 427-434, (2001).

Tao et al., ZSM-5 Monolith of Uniform Mesoporous Channels, Material Sciences, Chiba University, J. Am. Chem. Soc., Japan 2003, pp. 6044-6045.

* cited by examiner

COMPOSITIONS AND METHODS FOR IMPROVING THE HYDROTHERMAL STABILITY OF MESOSTRUCTURED ZEOLITES BY RARE EARTH ION EXCHANGE

RELATED APPLICATIONS

This application claims priority benefit under 35 U.S.C. Section 119(e) of U.S. Provisional Patent Ser. No. 61/145,723 filed Jan. 19, 2009, the entire disclosure of which is incorporated herein by reference.

BACKGROUND

1. Field

One or more embodiments of the invention relate to mesostructured zeolites containing rare earth elements and having improved hydrothermal stability.

2. Description of Related Art

The hydrothermal stability of zeolites is a major concern in some important refining operations, such as Fluid Catalytic Cracking (FCC) where the catalyst is exposed at severe steaming conditions in the regenerator. This treatment produces the uncontrolled dealumination of the zeolite causing a dramatic decrease of activity and selectivity towards the desired fractions.

SUMMARY

One embodiment of the invention concerns a material comprising at least one mesostructured zeolite one-phase hybrid single crystal having enhanced hydrothermal stability after regeneration, produced by the process of: (a) providing a non-mesoporous zeolite having long-range crystallinity and comprising rare earth elements; and (b) forming a plurality of mesopores within the non-mesoporous zeolite to thereby form the mesostructured zeolite.

Another embodiment of the invention concerns a method of forming a material comprising at least one mesostructured zeolite one-phase hybrid single crystal having long-range crystallinity and enhanced hydrothermal stability and microporosity retention after regeneration. The method of this embodiment comprises the steps of: (a) providing a non-mesoporous zeolite having long-range crystallinity; (b) adding rare earth elements to the zeolite; (c) acid washing the zeolite; and (d) forming a plurality of mesopores within the acid-washed zeolite to thereby form said mesostructured zeolite.

Yet another embodiment of the invention concerns a process for preparing a mesostructured zeolite comprising rare earth materials and a plurality of mesopores. The improvement of this process comprises: enhancing microporosity retention of a mesostructured zeolite after a hydrothermal regeneration by
 (a) ion exchanging rare earth materials into an initial zeolite to thereby form a rare earth exchanged zeolite; and
 (b) forming a plurality of mesopores in the rare earth exchanged zeolite to thereby form the mesostructured zeolite.

BRIEF DESCRIPTION OF THE DRAWING FIGURES

Embodiments of the present invention are described herein with reference to the following drawing figures, wherein.

DETAILED DESCRIPTION

Figure 1:
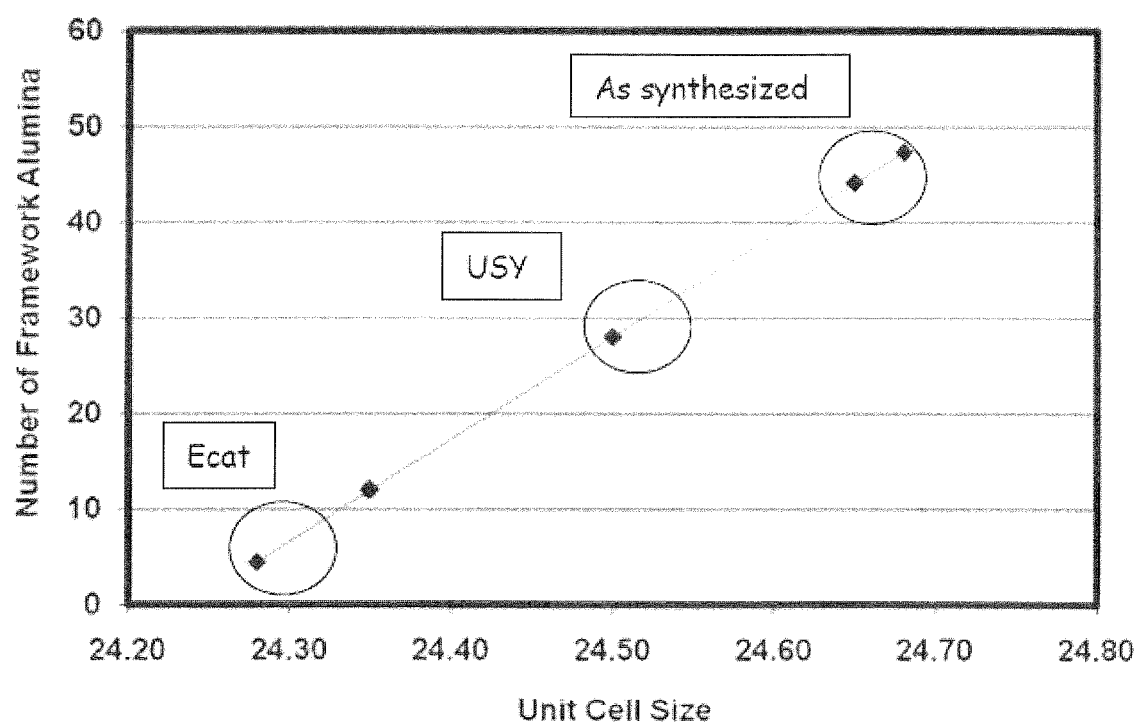
FIG. 1 is a graph depicting a typical correlation between framework alumina content and unit cell size of zeolites.

There are at least two main causes for non-reversible deactivation of FCC catalysts in the hydrothermal environment of an FCC regenerator. The first is the dealumination of the zeolite framework. Aluminum atoms, which provide needed acidity in the zeolite for catalytic cracking, are actually ejected from the framework during regeneration. As this occurs, the zeolite's unit cell size (UCS) contracts. A typical correlation between framework alumina content and UCS is shown in FIG. 1.

Note that the Y-type zeolite used in FCC catalysts typically can have a UCS of 24.65-24.70 Angstroms as synthesized. It can be reduced down to 24.50-24.60 Angstroms in the manufacturing process (i.e., as the zeolite is transformed into ultrastable Y zeolite (using prior art processes)). This is called ultstrastabilization (USY) and is done by controlled hydrothermal calcination of the zeolite to carefully dealuminate it. Carefully bringing the UCS down in a controlled manner to ca. 24.55 Angstroms results in a more stable zeolite as it heads off to the harsh, uncontrolled hydrothermal environment in the fluid cracking catalyst unit ("FCCU"). FIG. 1.

Equilibrium catalysts (ecat), the circulating inventory in an FCCU, have a range of UCS's dependent upon the catalyst properties and the severity of the FCCU environment. About 90% of the world's FCCUs operate at an ecat UCS of 24.24-24.32A. FIG. 1.

There are trade-offs as UCS decreases. While activity is lessened (less active alumina sites), depending upon the objectives of the FCCU, selectivity can be improved. For example, customers who desire maximum gasoline octane and maximum olefins look to equilibrate at low UCS. Customers who desire more gasoline yield will look to equilibrate at higher UCS.

Exchange of FCC catalyst zeolites with rare earths is one of the main ways to control UCS. Rare earths retard the tendency to dealuminate, and hence can be used, for example, to favor gasoline production. Retarding dealumination also preserves the activity and change selectivity. FCC catalyst manufacturers incorporate a specific amount of rare earths on the zeolite dependent upon the FCCU objectives and constraints.

The second main cause for non-reversible deactivation of FCC catalysts in the hydrothermal environment of an FCC regenerator is sintering, or destruction, of the zeolite The harsh environment of an FCCU can cause the zeolite structure to collapse. This is especially likely as the vanadium level in the FCCU feedstock increases and is even more pronounced in the presence of sodium, either from the unit feedstock or from residual sodium on the zeolite. Rare earths probably do not play a major role in mitigating this aspect of deactivation. Rather, control of sodium level and vanadium "traps" are employed.

In addition to controlling UCS, rare earth ion exchange can be used to improve the hydrothermal stability of zeolites. Other methods can be used to improve the hydrothermal stability of zeolites including controlled steaming (ultrastable zeolite) and chemical Al extraction (dealuminated zeolites). However, rare earth ion exchange is especially beneficial because each rare-earth cation coordinates to three negatively-charged positions of the zeolite inhibiting the extraction of the aluminum from the framework (dealumination) during operating conditions. An additional benefit of the rare-earth ion exchange in zeolites is an increase in gasoline yield due to the preservation of a high concentration of Bronstead acid sites. However, rare-earth ion exchange favors the hydrogen transfer reactions during cracking, causing a decrease in octane and cetane indexes of the gasoline fraction and the olefin content in the Liquefied Petroleum Gas (LPG) fraction.

The hydrothermal stability of mesostructured zeolites can be controlled by tuning the amount of the mesoporosity introduced without significantly affecting their original activity and selectivity.

Figure 2:
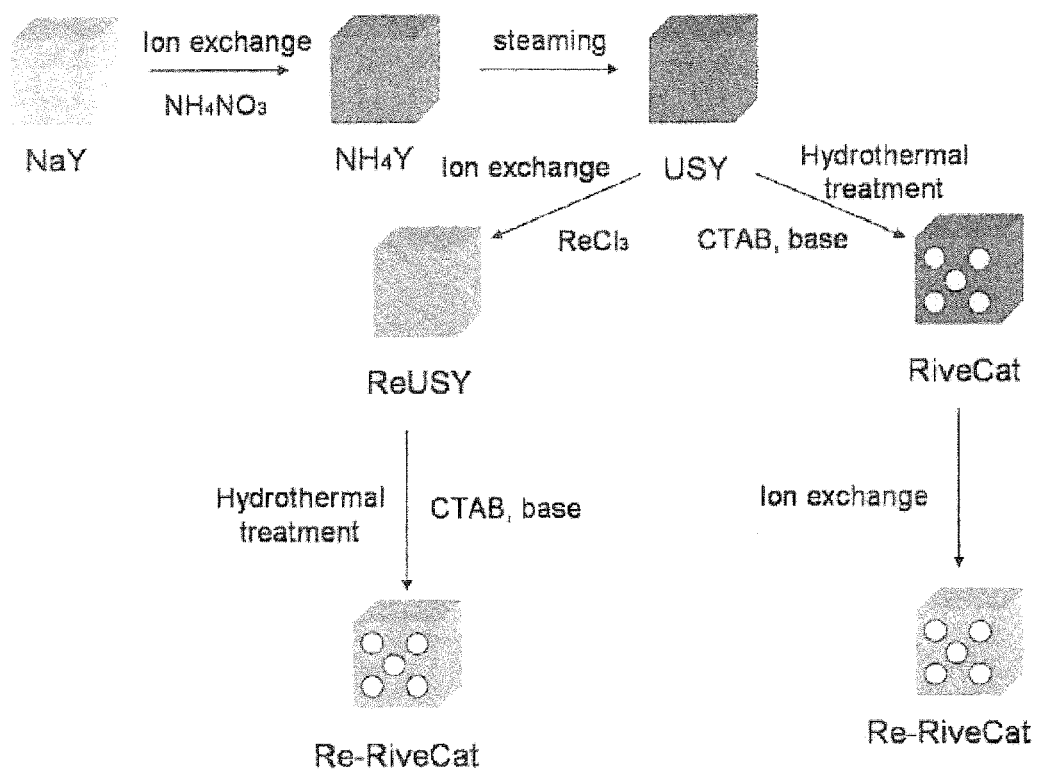
FIG. 2 is a process flow diagram depicting steps for preparing rare earth-containing mesostructured zeolites.

The incorporation of rare-earth cations in mesostructured zeolites by either (i) direct ion-exchange or by (ii) incorporation of mesoporosity into already rare-earth ion-exchanged zeolites (see FIG. 2) is an additional tool to further increase the hydrothermal stability of this novel family of materials. Introduction of rare earths into a zeolite prior to the riving step (the incorporation of mesoporosity into a zeolite) can improve the retention of microporosity, mesoporosity and crystallinity. In some cases, additional rare earths can still be applied to the zeolite after riving and ultrastabilization. As in the prior art, application of additional rare earths after riving can help to preserve the UCS targeted during the ultrastabilization step.

Since catalyst manufacturers want to typically reduce the UCS of the fresh zeolite to ca. 24.55 Angstroms, and because it is well known that rare earths retard UCS reduction, rare earths are normally applied in the catalyst manufacturing process after the ultrastabilization process. This allows ease of UCS reduction during manufacture and control of UCS reduction during end use. The rare earths can be applied either just before or even during the incorporation of the zeolite with the other ingredients that make up the composite catalyst formulation.

It is for this reason that most rare earths are added at the tail end of the zeolite processing. However, it was thought that incorporating rare earths upstream, before the riving process, might better position them in the desired location in the zeolite framework so as to better control UCS reduction of the final rived catalyst during regeneration in the FCCU. It was a pleasant surprise to see that doing so better preserved crystallinity (and hence acidity and activity) through the riving process, since preserving acidity is usually desired. As mentioned, this was not an expected result and is not a normal function of rare earths. The compromise is that the process of hydrothermal calcination/dealumination used during the ultrastabilization step must be adjusted to compensate for the presence of the rare earths. In addition a nominal amount of expensive rare earths can be removed in the riving step.

Figure 3:
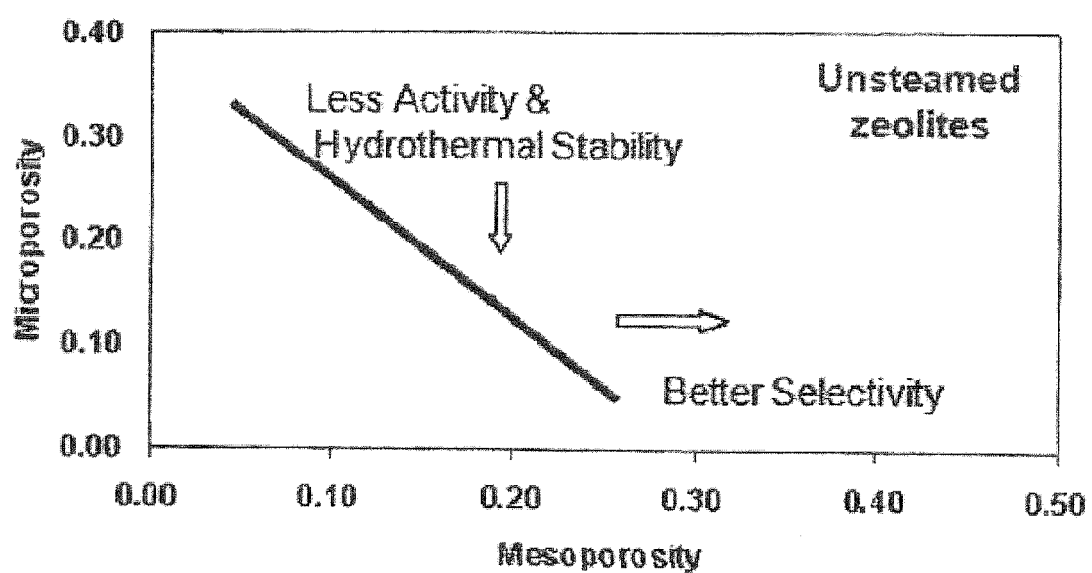
FIG. 3 is a graph depicting the expected activity and selectivity in the compromise between microporosity and mesoporosity in zeolite catalysts.

In the riving process, some of the zeolite's microporosity is sacrificed in order to introduce mesoporosity. This is done to obtain, at least for fluid catalytic cracking (FCC) applications, enhancement of the catalyst's selectivity (the yield of preferred products) at the likely sacrifice of catalyst activity. FIG. 3.

We expect this trade-off to occur because microporosity is to a large extent a measure of crystallinity, and how much crystallinity is preserved will in large part dictate activity, while mesoporosity implies improved accessibility, and therefore a better product slate (more transportation fuels, less coke, etc.)

Figure 4:
FIG. 4 is a graph depicting the loss of microporosity and mesoporosity in a steamed zeolite catalyst.

FIG. 4 depicts a fresh unsteamed USY type zeolite and a steamed USY type zeolite. In the laboratory, steam deactivation of the zeolite is used to mimic the hydrothermal deactivation that occurs in an FCCU. As FIG. 4 shows, steaming results in the loss of microporosity and mesoporosity of the zeolite. Prior to riving, the processing of the zeolite is typically synthesis of the sodium form zeolite (NaY), exchange with an ammonium salt to reduce the sodium level, and hydrothermal calcination to produce the USY.

The reduction of the hydrogen transfer reactions observed when mesoporosity is introduced in zeolites (probably due the ready exits of the products from the interior of the mesostructured zeolite), described in U.S. Pat. No. 7,589,041, is likely to reduce the adverse effect that rare-earth ion exchange in zeolites produces in octane and cetane indexes of the gasoline and the olefin content in the LPG fraction.

Still referring to FIG. 4, moving the fresh, and more importantly the steamed, curves up and to the right, is always desirable. More microporosity can result in more activity and more mesoporosity can result in better selectivity.

As discussed above, most FCC catalyst manufacturers ion exchange rare earths on their zeolites at the tail end of zeolite processing to minimize the deactivation that occurs in the FCCU and to optimize selectivity. The mechanism by which the rare earth works, predominantly, is to inhibit dealumination of the zeolite framework in the hydrothermal environment of the FCCU regenerator.

More recently, the potential benefit of incorporating the rare earths prior to the riving step has been explored. One can incorporate the rare earth 1) prior to the ultrastabilization step, 2) after the ultrastabilization but prior to the acid treatment that precedes riving, or 3) after the ultrastabilization and acid treatment and just prior to riving.

The zeolite can be acid washed to increase the silicon to aluminum ratio of the zeolite. However, if the rare earths are added to the zeolite before the zeolite is acid washed, the acid washing can remove some of the expensive rare earth elements. Therefore, when the rare earths are added to the zeolite before the zeolite is acid washed, the acid washing can be adjusted so that it is strong enough to produce the desired silicon to aluminum ratio in the zeolite, but not so strong that it removes an excessive amount of expensive rare earths.

Figure 5:
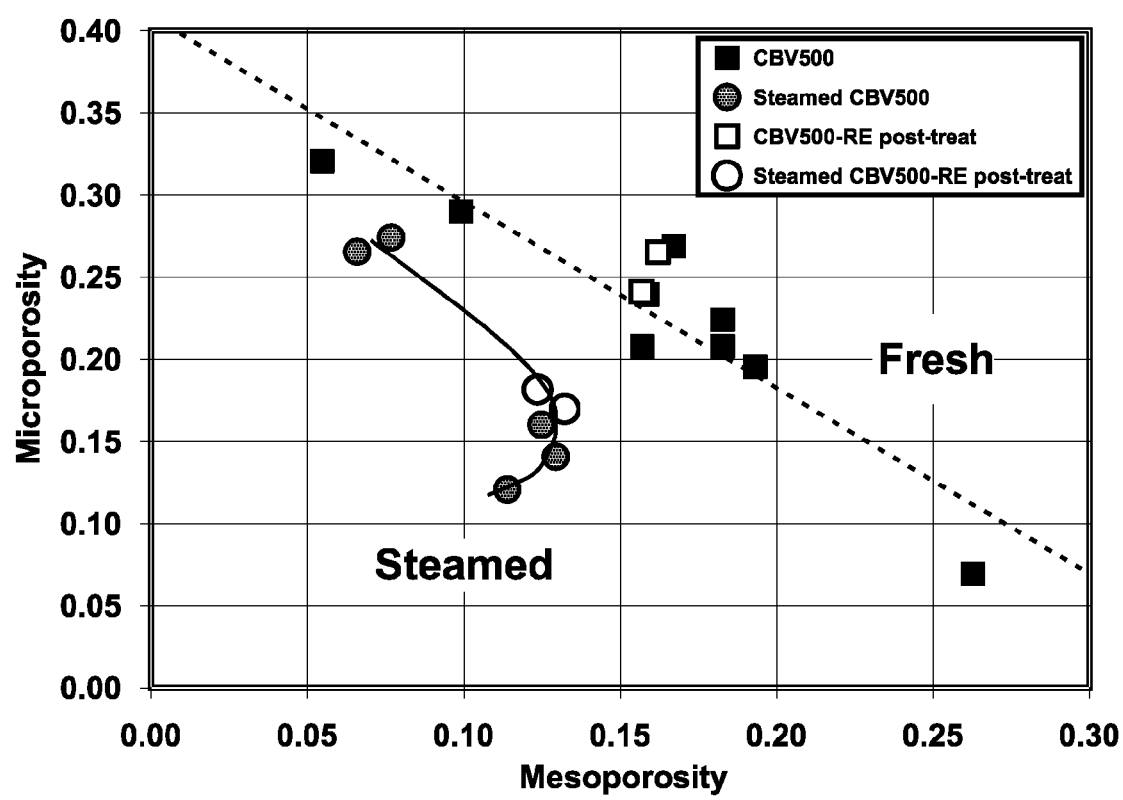
FIG. 5 is a graph depicting how both fresh and steamed porosities are not affected if the rare earth is exchanged on the CBV 500 zeolite after riving.
Figure 6:
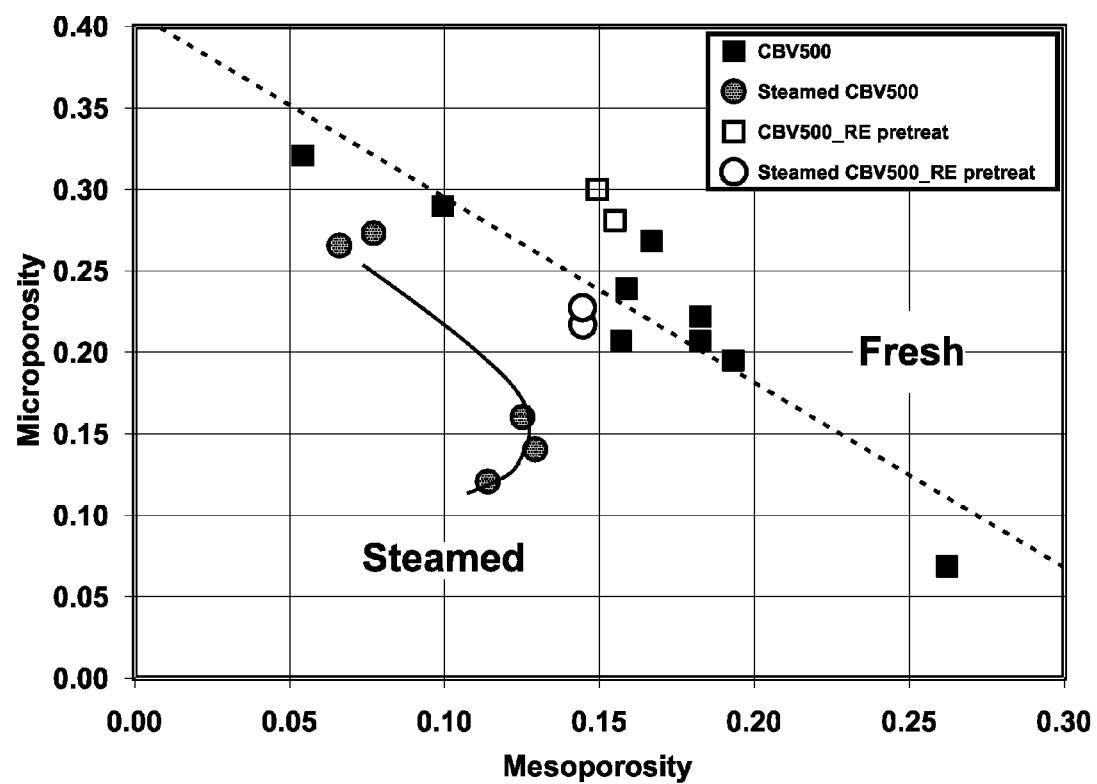
FIG. 6 is a graph depicting how both fresh and steamed porosities are improved if the rare earth is exchanged on the CBV 500 zeolite prior to riving.
Figure 7:
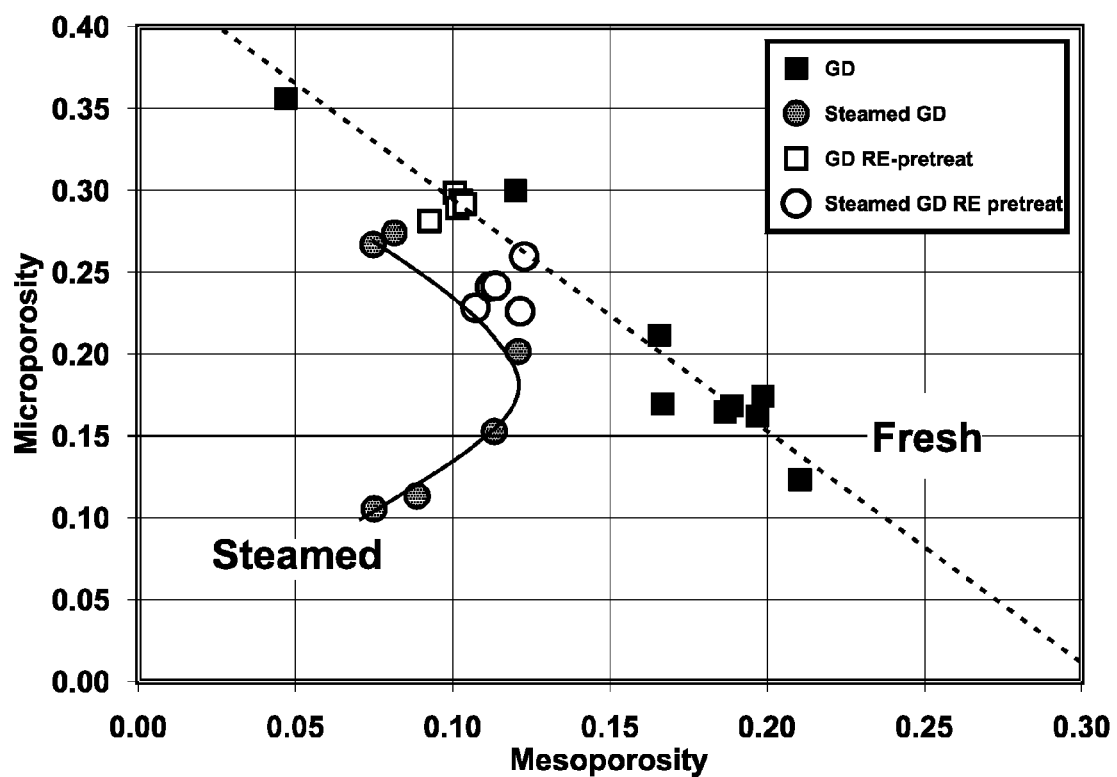
FIG. 7 is a graph showing how both fresh and steamed porosities are improved when Grace Davison's USY is used as the precursor.

FIGS. 5-7 show microporosity and mesoporosity retention for zeolites that were rare earth ion-exchanged after the ultrastabilization but prior to acid washing. This sequence of steps was used with USY type zeolite made by Zeolyst (CBV-500) as well as similar USYs made by Grace Davison.

FIG. 5 shows how both fresh and steamed porosities are not affected if the rare earth is exchanged on the CBV 500 after riving.

FIG. 6 shows how both fresh and steamed porosities are improved if the rare earth is exchanged on the CBV 500 prior to riving.

FIG. 7 shows how both fresh and steamed porosities are improved when Grace Davison's USY is used as the precursor.

Referring to FIGS. 5-7, the data points for the RE-USY rivings are better positioned than those of the RE-free USY rivings. This is good but somewhat surprising. The mechanism by which rare earths traditionally work is preventing dealumination at severe (about 1100° F. or greater) hydrothermal conditions. Contrast this with improvements in microporosity (crystallinity) retention at the relatively mild conditions (about less that 200° F.) of riving. The practical importance can be higher activity per unit of zeolite, which can be used for added performance or to mitigate cost by reducing the amount of zeolite required.

EXAMPLES

Example 1

Ultrastable zeolite Y, produced by controlled steaming of an $NH_4NO_3$ ion-exchanged zeolite NaY, was ion-exchanged with $RECl_3$ (RE indicating rare-earth elements in any ratio including but not limited to Lanthanum, Yttrium, and Neodymium) at room temperature and pH=4, and then calcined at 600° C. for 8 h.

This material was subsequently hydrothermally treated in the presence of a surfactant and pH controlling agent to introduce controlled mesoporosity as described elsewhere (U.S. Pat. No. 7,589,041.

Example 2

Ultrastable zeolite Y, produced by controlled steaming of an NH4NO3 ion-exchanged zeolite NaY, is hydrothermally treated in the presence of a surfactant and pH controlling agent to introduce controlled mesoporosity as described elsewhere (U.S. Pat. No. 7,589,041.

This mesostructured zeolite was subsequently ion-exchanged with $RECl_3$ (RE indicating rare-earth elements in any ratio including but not limited to Lanthanum, Yttrium and Neodymium) at room temperature and pH=4, and then calcined at 600° C. for 8 h.

Note: $NH_4Y$ can be also first rare-earth ion-exchanged and then steamed to produce Re-USY.

What is claimed is:

1. A method of forming a material comprising at least one mesostructured zeolite one-phase hybrid single crystal having long-range crystallinity and enhanced hydrothermal stability and microporosity retention after regeneration, comprising the steps of:
  (a) providing a fully-crystalline non-mesoporous zeolite having long-range crystallinity wherein said non-mesoporous zeolite comprises a faujasite;
  (b) adding rare earth elements to said non-mesoporous zeolite;
  (c) acid washing said non-mesoporous zeolite to thereby form an acid-washed zeolite, wherein said acid washing modifies the silicon to aluminum ratio in said non-mesoporous zeolite; and
  (d) forming a plurality of mesopores within said acid-washed zeolite to thereby form said mesostructured zeolite, wherein said forming occurs in the presence of at least one surfactant.

2. The method of claim 1, further comprising subjecting at least a portion of said mesostructured zeolite to hydrothermal regeneration, wherein a microporosity of said mesostructured zeolite after said hydrothermal regeneration is at least about 85% of a microporosity of said mesostructured zeolite before said hydrothermal regeneration.

3. The method of claim 1, further comprising subjecting at least a portion of said mesostructured zeolite to hydrothermal regeneration, wherein said mesostructured zeolite has substantially more microporosity after said hydrothermal regeneration than does a second fully-crystalline mesoporous zeolite of substantially the same structure and initial composition as said mesostructured zeolite, which is formed by steps (a), (c), and (d), without adding rare earth elements to the zeolite.

4. The method of claim 1, wherein said non-mesoporous zeolite comprises said rare-earth elements following step (b) in a total concentration of 0.01-15 weight percent on the basis of $RE_2O_3$ present in said zeolite.

5. The method of claim 1, wherein said non-mesoporous zeolite consists essentially of a type Y zeolite.

6. The method of claim 1, further comprising:
  (e) stabilizing said non-mesoporous zeolite or said mesostructured zeolite by hydrothermal calcination.

7. The method of claim 6, wherein step (e) is performed before step (c).

8. The method of claim 6, wherein step (b) is performed after step (e).

9. The method of claim 6, wherein step (e) results in said mesostructured zeolite having a unit cell size of about 24.50 to 24.60 Angstroms.

10. The method of claim 1, further comprising subjecting at least a portion of said mesostructured zeolite to hydrothermal regeneration, wherein the microporosity of said mesostructured zeolite after said hydrothermal regeneration is enhanced compared to a third fully-crystalline mesoporous zeolite of substantially the same structure and initial composition as said mesostructured zeolite that is formed by steps (a) through (d), but wherein step (b) is performed after step (d).

11. The method of claim 1, further comprising subjecting at least a portion of said mesostructured zeolite to hydrothermal regeneration, wherein the microporosity of said mesostructured zeolite after said hydrothermal regeneration is enhanced compared to a another fully crystalline mesoporous zeolite of substantially the same structure and initial composition as said mesostructured zeolite that is formed by steps (a) through (d), but wherein step (c) is not performed directly after step (b).

12. The method of claim 1, wherein said rare earth elements are added to said non-mesoporous zeolite by ion exchange.

13. The method of claim 1, wherein said surfactant comprises cetyltrimethylammonium bromide ("CTAB").

* * * * *